United States Patent [19]

Beecher

[11] 3,981,021

[45] Sept. 14, 1976

[54] BINOCULAR ADAPTER FOR A CAMERA HAVING A RECESSED LENS

[76] Inventor: William J. Beecher, 1960 Lincoln Park West, Chicago, Ill. 60614

[22] Filed: June 27, 1975

[21] Appl. No.: 591,060

[52] U.S. Cl. ................................. 354/79; 350/19; 354/286
[51] Int. Cl.² ................... G02B 23/12; G03B 17/48
[58] Field of Search ..................... 354/79, 295, 286; 350/19

[56] References Cited
UNITED STATES PATENTS

| | | | |
|---|---|---|---|
| 2,765,718 | 10/1956 | Beecher | 354/79 X |
| 2,933,992 | 4/1960 | Bushnell et al. | 354/79 |
| 2,974,573 | 3/1961 | Faasch | 354/79 X |
| 3,545,355 | 12/1976 | Cahall, Jr. | 354/79 |
| 3,721,170 | 3/1973 | Johnson | 354/79 X |

Primary Examiner—L. T. Hix
Assistant Examiner—E. M. O'Connor
Attorney, Agent, or Firm—Norman H. Gerlach

[57] ABSTRACT

An adapter for temporarily and releasably attaching or connecting the eyepiece barrel of one telescope of a binocular to a camera of the type which has a deeply recessed lens, to the end that the optical or lens system of such telescope may serve as a telephoto lens system for the camera, while the other telescope of the binocular is capable of serving as sighting means for the user of the camera. An optical image diverter which is associated with the adapter projects into the camera recess and increases the eye relief of the one telescope of the binocular and carries the image backward or rearwards through the camera recess so as to retrofocus such image on the camera film with or without magnification or demagnification and without vignetting.

10 Claims, 7 Drawing Figures

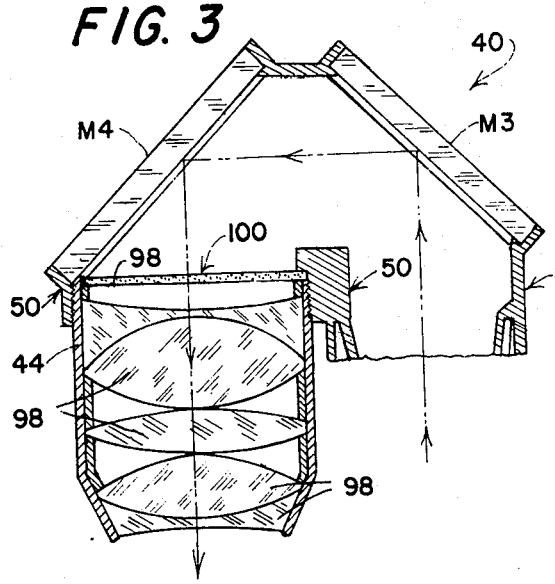
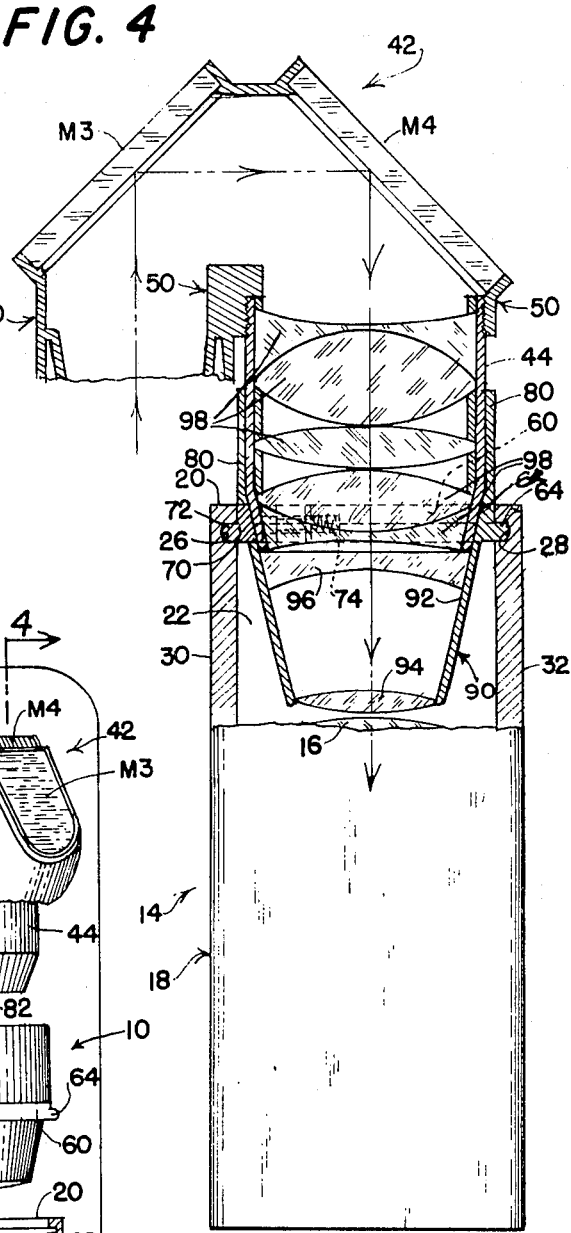
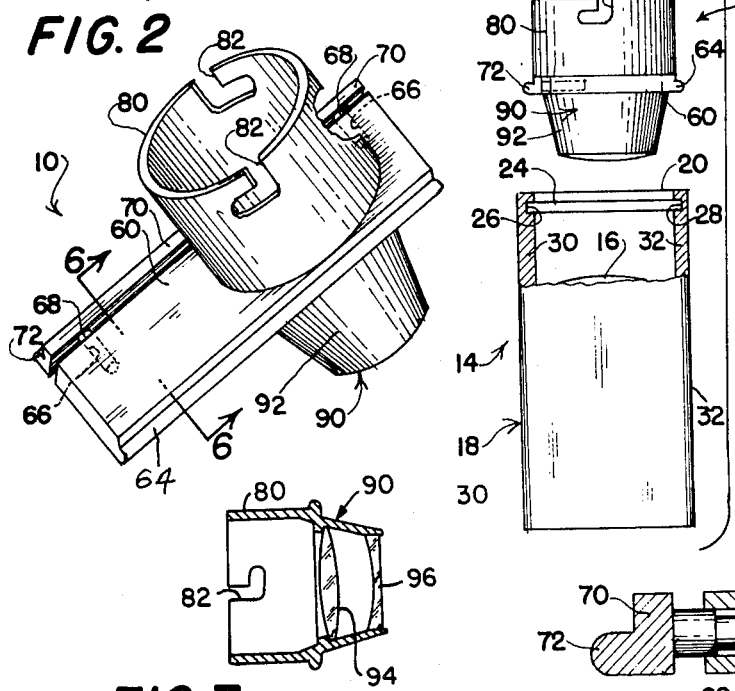
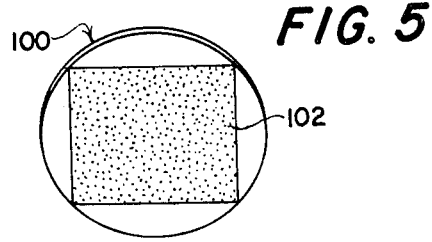
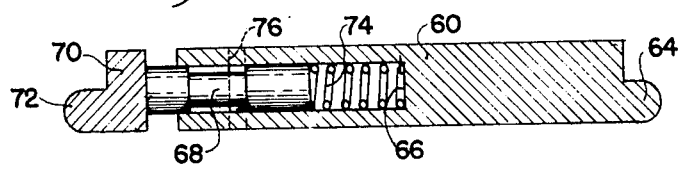

BINOCULAR ADAPTER FOR A CAMERA HAVING A RECESSED LENS

The use of a binocular for telephoto purposes in connection with photographic work has long been resorted to, the procedure involving bringing the camera lens into a position of close proximity and optical alignment with the eyepiece barrel of one of the telescopes of the binocular, sighting through the other binocular telescope, and then operating the camera to take a picture. The impression which is effected upon the camera film is, of course, a duplicate of the image which is brought to the eye of the photographer. Where a particular binocular and camera are so designed that the camera lens may be brought into close proximity or actual contact with the eye lens of the associated telescope binocular, the camera will then take a picture of precisely what the eye sees though the other binocular telescope and the resultant magnified picture will be devoid of any vignetting effect, providing of course that the binocular has sufficiently wide angle characteristics as to exceed those of the camera.

It is a demonstrable fact that when thus using one telescope of a binocular as a telephoto lens system, if the camera lens is not brought into extremely close proximity with the eye lens of the binocular, vignetting of the picture on the camera film will take place and a dark circular framing ring will encompass the positive reproduction of the image on the final picture. The greater the distance between the two opposed lenses of the camera and the associated binocular telescope, the wider will be the framing ring and the smaller will be the circular image within such ring, the size of the circular image being a reverse algebraic function of the involved distance.

With a camera having a lens which is deeply recessed within the body of the camera, it is impossible to place the eye lens of the associated telescope binocular sufficiently close to the camera lens as to avoid vignetting of the picture image on the film. This is particularly true of present day small pocket cameras where the depth of the lens recess is often as much as a full inch so that the resulting picture-vignetting is totally unacceptable.

The present invention is designed to overcome the above-noted limitation that is attendant upon the use of a binocular for telephoto purposes in connection with a small pocket camera and, toward this end, the invention contemplates the provision of an adapter which has associated therewith an optical image diverter which, when the adapter is operatively applied to the camera and one of the binocular telescopes, projects into the lens recess in the camera body, increases the eye relief of the binocular, and carries the binocular image rearwards or backwards through the recess so as thus to retrofocus such image on the camera film with full effect and without vignetting. In some cases, however, vignetting is reduced but not wholly eliminated. The provision of such an adapter constitutes the principal object of the present invention.

Numerous other objects and advantages of the invention, not at this time enumerated, will become readily apparent as the nature of the invention is better understood from a consideration of the following detailed description.

The invention consists in the several novel features which are hereinafter set forth and are more particularly defined by the claims at the conclusion hereof.

In the accompanying single sheet of drawings forming a part of this specification, one illustrative embodiment of the invention is shown.

In these drawings:

FIG. 1 is an exploded top plan view of a substantially conventional viewing binocular and a conventional camera, both shown in their proper relationship with respect to the adapter of the present invention, preparatory to assembly operations;

FIG. 2 is an enlarged perspective view of the adapter;

FIG. 3 is an enlarged fragmentary horizontal sectional view on the line 3—3 of FIG. 1 and with the various lenses being shown in elevation;

FIG. 4 is an enlarged fragmentary horizontal sectional view taken substantially on the line 4—4 of FIG. 1 and showing the binocular, the camera and the adapter in their assembled relationship and the various lenses in elevation;

FIG. 5 is a plan view of an infinity-focusing disk which may be employed in conjunction with use of the present adapter;

FIG. 6 is an enlarged transverse sectional view taken substantially on the line 6—6 of FIG. 2, and FIG. 7 is a reduced longitudinal section of an alternate or modified form of adapter wherein the negative lens and the positive lens are positioned reversely from the position shown in FIG. 4.

Referring now to the drawings in detail and in particular to FIGS. 1 and 2, an adapter embodying the principles of the present invention is designated in its entirety by the reference numeral 10, the purpose and function of such adapter being to enable a binocular of the general type which is illustrated in FIG. 1 and is designated in its entirety by the reference numeral 12 to be temporarily joined to a camera like the illustrated camera 14 so that the lens system of one of the two telescopes of the binocular is in optical register with the lens system of the camera, thereby enabling such lens system of the binocular to function as a telephoto lens system for picture taking purposes, while the lens system of the other telescope of the binocular 12 may be used for sighting purposes.

The specific details of the camera 14 have not been illustrated herein since they bear no relation to the present invention and may vary widely. However, the camera which is shown in the drawings is of the pocket type wherein its picture-taking lens 16 is deeply recessed in the front portion of its casing 18. In other words such lens is displaced rearwardly from the general plane of the front wall of such casing, thus affording a relatively deep rectangular recess 22 (see FIG. 4) in the front portion of the camera. In order to protect the lens 16 against contamination when the camera is not in use, as well as to shield the same, a rectangular cover plate 24 is guided in opposed elongated parallel guideways 26 and 28 in order that it is slidable in the plane of the casing front wall back and forth between a closed position in which it overlies and protects the lens 16 and an open position wherein it exposes such lens for picture-taking purposes. The aforesaid guideways are formed respectively in the front marginal positions of the side walls 30 and 32 of the casing 18. The cover plate 24 is shown in its open or retracted out-of-the-way position in FIG. 1 of the drawings and when it is in such position it is disposed alongside of the recess 22 and fully exposes the camera lens 16 for picture-taking purposes. Various small cameras of the pocket type wherein the lens is deeply recessed in the front wall of the casing are currently in use, one such camera being manufactured and sold by Eastman Kodak Company of Rochester, New York under the trade name "Instamatic," another such camera being marketed by Ponder and Best of Los Angeles, California under the trade name "Vivitar."

The specific details of the binocular 12 likewise have not been illustrated since they also may vary widely. The particular binocular which is shown in the drawings is of the particular type which is shown and described in my copending continuation United States Pat. application Ser. No. 556,737, filed on Mar. 10, 1975 and entitled "BINOCULAR HAVING SMALL SIZE, LIGHTWEIGHT, AND HIGH PERFORMANCE CHARACTERISTICS." The illustrated binocular is essentially of comparatively small size and is thus adaptable for use as a telephoto counterpart for either the pocket size camera mentioned above or, in fact, any camera having a deeply recessed lens.

For a full disclosure of the nature of the binocular 12, reference may be had to the aforementioned copending application Ser. No. 556,737. The entire disclosure of such application, insofar as it is consistent with the present disclosure, is hereby incorporated in and made a part of the present patent application by reference thereto. However, for illustrative purposes herein it is deemed sufficient to point out that the binocular 12 is comprised of two side-by-side counterpart telescopes 40 and 42, the telescope 40 as viewed in FIG. 1 ordinarily being designed for viewing cooperation with the user's left eye and the telescope 42 being designed for viewing cooperation with the user's right eye. In the following description, insofar as is practicable, reference to the binocular 12 will be made on the basis that the part of the binocular which includes the cylindrical eyepiece barrels 44 will be considered as the front of the binocular, while the part which includes the objective barrels 46 will be considered as the rear of the binocular. The two telescopes are connected together by a hinge connection 48 in order that they may be swung to and from one another for eye-adjusting purposes.

Each telescope involves in its general organization a series of four horseshoe-shaped mirrors or reflectors M1, M2, M3 and M4 (see FIGS. 3 and 4), such mirrors being arranged in Porro-one relationship at mutual right angles and also being supported in a unitary housing or shell 50. The latter serves fixedly to support the associated eyepiece barrel 44 and rotatably to support the associated objective barrel 46. A feature of the binocular which is disclosed in my aforementioned U.S. Pat. application Ser. No. 556,737 resides in the fact that, although the binocular is of the center focusing type, individual focusing of either telescope 40 or 42 may be attained by rotating the associated objective barrel 46. This is made possible by reason of the fact that each objective barrel 46 is rotatably and threadedly supported in a circular aperture (not shown) within the associated telescope shell 50 in a manner that is generally known. Center focusing of the binocular, i.e., simultaneous correlated focusing of the two counterpart telescopes, is accomplished by rotating either objective barrel 46 and the rotary motion of such barrel is translated to the other barrel by means of an idler pinion 52 which meshes with gears 54 which are mounted respectively on the shells 50 with a sliding frictional fit. Although either objective barrel 46 is capable of being individually adjusted by rotating it while holding the other objective barrel stationary, for photographic purposes according to the present invention the gears 54 may be considered to be fixedly secured or locked to the associated barrels 46 for rotation in unison therewith.

The adapter 10 of the present invention is designed for use in temporarily or releasably connecting one of the eyepiece barrels 44 of the binocular 12 to the camera 14 for photographic purposes. Preferably, the right hand eyepiece barrel 44 is employed when the connection is made so that the user may utilize the left hand eyepiece barrel for sighting purposes when taking a picture, the sighting being accomplished through the medium of the user's right eye. When thus sighting preparatory to taking a picture, the right hand eyepiece barrel 44, and consequently the entire right hand telescope 42 will assume a laterally displaced out-of-the-way position at the right side of the user's head where the assembly which consists of the right hand telescope 42, the adapter 10, and the camera 14 will encounter no interference with the user's head or any other portion of his body. However, under certain circumstances, as, for example, in a situation where the right eye vision of the user is relatively weak so that it is expedient for him to sight through his left eye, the adapter and camera may be secured to the eyepiece barrel 44 of the left hand telescope and sighting may then be accomplished through the eyepiece barrel of the right hand telescope 42.

Considering now the adapter 10 of the present invention, such adapter is comprised of a generally flat rectangular plate 60 having longitudinal edge regions which are designed to be removably received in the opposed guideways 26 and 28 in the front marginal portions of the side walls 30 and 32 of the camera casing 18 by a snap action. The adapter plate 60 may be installed in the front portion of the recess 22 when the sliding cover plate 24 is moved to its retracted or open position and, when so installed, a circular opening 62 (see FIG. 4) in the plate registers with the camera lens 16.

In order releasably to retain the adapter plate 60 in its operative position within the recess 22, one longitudinal edge thereof is provided therealong with an elongated rib 64 (see FIGS. 2 and 6) which is designed for reception in the right hand guideway 28. The other longitudinal edge of the plate 60 has formed therein a pair of relatively deep cylindrical sockets 66, such sockets being disposed a slight distance inwards from the end edges of the plate 60. The two sockets receive respectively therein a pair of plungers 68, and the two plungers serve to support a detent bar 70 which is coextensive with the adjacent longitudinal edge of the plate 60 and has formed thereon an elongated detent rib 72, the latter being designed for reception within the left hand guideway 26 when the plate 60 is installed within the front portion of the recess 22. A compression spring 74 yieldingly biases each plunger 68 outwardly away from the adjacent longitudinal edge of the plate 60, while a roll pin or the like 76 limits the extent of outward movement of each plunger.

Referring now to FIGS. 1, 2 and 4 of the drawings, an attachment sleeve 80 is suitably fixedly connected to and projects outwardly from the rear side of the plate 60 and is coaxial with the opening 62. The diameter of the sleeve 80 is such that it fits snugly over the cylindrical objective barrel 44 of the right hand telescope 42 of the binocular 12. Two diametrically opposite bayonet slots 82 are formed in the outer circular rim of the sleeve 80 and are designed for cooperation with a pair of diametrically opposite pins 84 which are fixedly connected to and project radially outwardly from the right hand eyepiece barrel 44 of the binocular 12, the bayonet slots 82 being so designed that when the pin and slot connections 84, 82 are fully engaged, the adapter 10 and the binocular 12 are releasably connected together and the plate 60 of the adapter extends vertically and thus maintains the camera 18 in its normal vertical picture-taking position when the latter is operatively applied to the plate 60.

Still referring to FIGS. 1, 2 and 4 of the drawings, an optical image diverter 90 is suitably fixedly connected to and projects outwardly from the front side of the plate 60, such diverter embodying a frusto-conical shell or lens holder 92 within which there is disposed a lens combination including a double convex positive converging lens 94 of short focal length and a planoconcave negative diverging lens 96 which is likewise of short focal length. The lens 94 is suitably fixedly mounted in the front or outer rim of the frusto-conical lens holder 92 and the lens 96 is suitably fixedly mounted in the rear or inner rim of the holder. When the plate 60 of the adapter 10 is operatively installed in the recess 22 in the front position of the camera 14 as shown in FIG. 4, the lens 94 is disposed in nearly contiguous or abutting relationship with respect to the picture-taking lens 16 of the camera, while the lens 96 which in effect extends across the circular opening 62 in the plate 60 assumes a position in substantial contact with the rearmost lens of a five lens component or cluster 98 which is disposed within the right hand eyepiece barrel 44 of the binocular 12.

The cylindrical attachment sleeve 80, the frustoconical shell 92 of the optical image diverter 90, and the plate 60 by means of which the adapter 10 is a whole may be removably attached to the camera 14 are preferably, but not necessarily, integrally formed. For purposes of discussion herein, as well as definition in the appended claims, the sleeve 80 and the diverter lens holder 92 exclusive of the lens system within the latter, may be regarded as an openended tubular adapter proper, while the plate 60 may be regarded as the attachment flange whereby such adapter proper may be releasably applied to the camera 14.

The function of the optical image diverter 90 is to bring the image backwards through the recess 22 in the front portion of the camera 14 in order to compensate for the deep recessing of the picture-taking lens 16. In the absence of such an optical image diverter, vignetting of the image on the camera film, as a result of taking a picture with the aid of the right hand telescope 42 of the binocular 12, would take place. This backward displacement of the image is effected inasmuch as the short focal length negative lens 96 which forms a part of the adapter 10 and is contiguous to the frontmost eye lens of the right hand eyepiece barrel 44 diverts the converting rays sharply outwardly at a comparatively wide angle where they are received by the positive converging lens 94 and thus converged precisely onto the camera film. In this manner the relatively small circular image which is produced by the binocular telescope alone and normally is intended for viewing by the eye of the user is transmitted backward by a retrofocusing action so that it covers the full field or frame of the film in the camera 14.

In this regard, it is to be noted that varying combinations of lenses 94 and 96 as well as lens spacings may be used within the lens holder 92 in order to produce desirable effects. For example, an ideal arrangement may be attained by utilizing a negative diverging lens 96 of 27mm. focal length and positioning it so that it is in touching relationship with respect to the frontmost lens of the lens cluster 98 in the right hand eyepiece barrel 44, and by utilizing a positive converging lens 94 of 23 mm. focal length and positioning it 7 mm. from the lens 96. With such an arrangement, the magnified image on the camera film will be the full 8x power of the binocular 12. By varying the relative power and spacing of the negative diverging lens 96 and the positive converging lens 94, it is possible to reduce the magnifying effect of the binocular and the optical image diverter 90 on the camera film as desired. It is also possible to obtain an increase in magnification on the film beyond the normal magnification factor of the binocular by reversing the positions of the lenses 94 and 96, as shown in FIG. 7 and in accordance with well known engineering or optical expediencies.

In the use of the present adapter 10, it is essential that, as a preliminary step, both of the binocular telescopes 40 and 42, as well as the camera 14, be focused for their infinity settings. With most center focusing binoculars, the right hand eyepiece barrel is adjustable for focusing purposes independently of the usual center focusing wheel, and such eyepiece barrel usually is marked at the factory for precise infinity focusing. With the illustrated binocular 12, the right hand objective barrel 46 is adjustable for focusing as previously set forth and, therefore, this right objective barrel may be marked at the factory for infinity focusing. Regardless of whether the adapter 10 be employed in connection with a center focusing binocular in which the right eyepiece barrel is individually adjustable for focusing purposes, or with the binocular 12 in which the right hand objective barrel 46 is adjustable for the purpose of focusing, it will be assumed for purposes of discussion herein that such adjustable barrel be appropriately marked for an infinity focusing adjustment.

After the infinity adjustment of the right telescope 42 has thus been effected, the photographer will then attend to making an infinity adjustment for the left binocular telescope 40 which, it will be remembered, is used for sighting purposes by the right eye of the photographer when the adapter 10 and the camera 14 are in operative position on the binocular. This may be done in various ways, depending upon the particular binocular being used but, with the illustrated binocular 12, the procedure is for the photographer to sight an object at infinity through the left hand telescope 40 without disturbing the infinity focusing which previously has been made for the right telescope 42. To accomplish this, the photographer may restrain the objective barrel 46 of the right binocular telescope 42 with his or her fingers while rotating the objective barrel 46 of the left binocular telescope 40 while at the same time sighting through such left hand telescope with his or her right eye. After the left hand telescope 40 has thus been focused at infinity, general focusing may be accomplished by rotating either objective barrel 46 since both such barrels are linked together by slip fittings as previously indicated. In order to insure that a true infinity focusing adjustment of the left hand telescope 40 of the binocular 12 will be made, a conventional ground glass screen 100 (see FIG. 5) having a framing rectangle 102 etched thereon may be interposed between the frontmost lens of the five lens cluster 98 of the left hand eyepiece barrel 44 and the adjacent reflector M4. This screen 100 may be held in position by screwing the left hand eyepiece barrel 44 against it, in which case the screen will be positioned at the focal plane of the left hand lens cluster 98. With the screen 100 in place, all viewers will be forced to focus the left hand telescope farsightedly and alike so that any tendency for a particular viewer to focus the telescope nearsightedly will be obviated.

As soon as individual eye differences are adjusted in the manner indicated above, the adapter 10 may be applied to the eyepiece barrel 44 of the right hand telescope 42 of the binocular 12, utilizing the pin and bayonet connections 82, 84 to hold the attachment sleeve 80 of the adapter in its proper position over said eyepiece barrel. Attachment of the camera 14 to the adapter is made by a snap-in action wherein the fixed rib 64 of the adapter plate 60 is first inserted in the guideway 28 (see FIG. 4) in the portion of the camera casing side wall 32 which is adjacent to the recess 22 and, thereafter, the detent rib 72 on the spring biased detent bar 70 is pushed into the guideway 26 in the portion of the casing side wall 30 which is adjacent to the recess 22 in the front portion of the camera 14. To facilitate such a snap-in action, the outer side of the detent rib 72 is rounded. After such installation of the adapter and proper sighting of the object undergoing photographing has been effected utilizing the right hand eye of the photographer in association with the left hand binocular telescope 40, the camera 18 may be operated.

Although the invention has been described herein in connection with the use of the adapter 10 when employing a binocular of the general type which is disclosed in my copending U.S. Pat. application Ser. No. 556,737, it is to be distinctly understood that the adapter, by suitable modification, may be used in connection with other forms of binoculars regardless of whether the same be of the center focusing or the individual focusing type. Furthermore, although the illustrated camera 14 utilizes a lens recess 22 which is generally rectangular and in which the side walls 30 and 32 are formed with guideways 26 and 28 for sliding reception of the cover plate 28, the adapter of the present invention is susceptible of use in connection with cameras having various forms or configurations of lens recesses. The only criterion is that whatever binocular and camera are used in connection with the adapter, the latter be designed so that the attachment sleeve 80 thereof will fit one of the eyepiece barrels of the binocular, and that the optical image diverter 90 thereof will fit the lens recess which is associated with the camera in such a manner as to establishing the desired retrofocusing function. Still further, it is not essential that the particular binocular which is employed for telephoto purposes be of the center focusing type. Where individual focusing telescope barrels are concerned, a proper focus of the image on the camera film may be attained by utilizing the factory marked setting of the left hand binocular telescope and then adjusting the right hand telescope for an infinity adjustment while sighting through such telescope with the photographer's right eye, or otherwise adjusting the left hand binocular telescope for effective sighting without disturbing the adjustment of the previously adjusted right hand binocular telescope. If less than an infinity adjustment is required to bring the object into proper focus on the film, it is only essential that both binocular telescopes be equally adjusted and then maintained in such adjustment while the picture is being taken. Finally, the provision of the rectangular plate 60 with its snap action detent means (rib 64 and spring-biased rib-equipped detent bar 72) is exemplary of an effective attachment means whereby the adapter 10 may be applied to the particular disclosed camera 14, namely, a camera of the "Instamatic" type as previously mentioned. For other types of recessed lens cameras, the adapter will be modified by utilizing other forms of snap-in attachment means which will hold the adapter in its operative position of register with the camera lens. In the case of a reflex camera, in which a mirror in the camera body permits visual focusing, the binocular-camera combination may be focused through the camera viewfinder. In this case the left half of the binocular would not be used as a viewfinder. Therefore, only insofar as the invention is particularly pointed out in the accompanying claims is the same to be limited.

Having thus described the invention, what I claim as new and desire to secure by Letters Patent is:

1. An adapter for releasably connecting one eyepiece barrel of a binocular to a camera of the recessed lens type for photographic impression of an image on the camera film, said eyepiece barrel having an eye lens at its front end, said camera having a relatively deep lens recess in its front portion and a camera lens disposed in said recess, said adapter embodying an image diverter in the form of a tubular open-ended lens holder designed for reception in the recess and axial interpositioning thereof between said eye lens and the camera lens, the longitudinal extent of said lens holder being substantially equal to the depth of the camera recess whereby, when the holder is disposed in the recess, its front end and the camera lens are in contiguity, and an optical lens system disposed within said lens holder and effective when the rear region of the holder is disposed in contiguity with the eye lens of said eyepiece barrel and the holder is in the recess to increase the eye relief of said eyepiece barrel and carry the image established thereby rearwardly to the camera lens for subsequent impression on the camera film.

2. An adapter as set forth in claim 1 and wherein said optical lens system within the lens holder embodies a positive converging lens adjacent to one end of the holder and a negative diverging lens adjacent to the other end of the holder.

3. An adapter as set forth in claim 2 and wherein said positive converging lens is disposed adjacent to the front end of the lens holder.

4. An adapter as set forth in claim 2 and wherein said positive converging lens is disposed adjacent to the rear region of the holder.

5. An adapter as set forth in claim 2 and wherein the focal lengths of said positive and negative lenses are such that substantially no magnification of the image which is transmitted through the image diverter takes place.

6. The combination with a camera of the recessed lens type having a relatively deep lens recess in its forward face and a camera lens disposed within said recess, and a binocular telescope having an eyepiece barrel provided with a lens system including an eye lens at its front end, of an adapter removably interposed between the camera and the binocular telescope and serving optically to align the lens system of said eyepiece barrel with the camera lens, said adapter comprising a tubular open-ended body having its rear end region telescopically received over said eyepiece barrel and having its front end region projecting into said recess and terminating adjacent to said camera lens, cooperating means on said camera and adapter body for removably retaining said front end region of the adapter body within said recess, and an optical lens system disposed within said front end region of the adapter body and serving to increase the eye relief of the eyepiece and carry the image established thereby back to the camera lens for subsequent impression on the camera film.

7. The combination of claim 6 and wherein said lens system within the adapter body embodies a positive converging lens adjacent to one end of said front region of the adapter body and a negative diverging lens adjacent to the other end of said front region of the adapter body.

8. The combination of claim 7 and wherein said positive converging lens is disposed in contiguity with said camera lens and the negative diverging lens is disposed in contiguity with the eye lens of the telescope eyepiece barrel.

9. The combination of claim 7 and wherein said negative converging lens is disposed in contiguity with said camera lens and the positive converging lens is disposed in contiguity with the eye lens of the telescope eyepiece barrel.

10. The combination of claim 7 and wherein said means for removably retaining the front end region of the adapter body within the recess in the camera comprises an attachment flange on the adapter body, and cooperating detent means on said attachment flange and the wall of the recess for removably retaining said attachment flange in position across the outer rim portion of the recess.

* * * * *